May 21, 1968   J. R. HARRIS, JR   3,384,763
POWER CONTROL CIRCUIT UTILIZING LOW RESISTANCE CONTROL
Filed Feb. 5, 1965
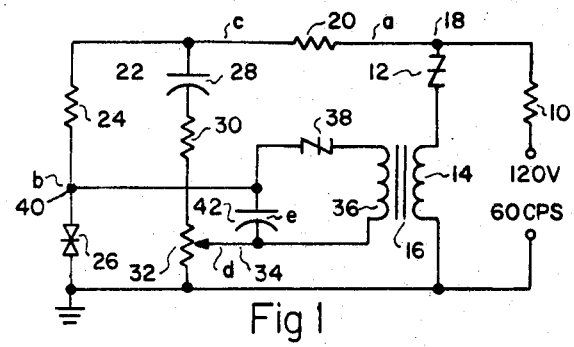
Fig 1
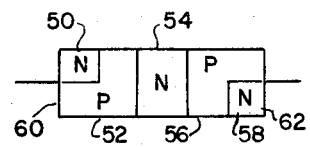
Fig 2
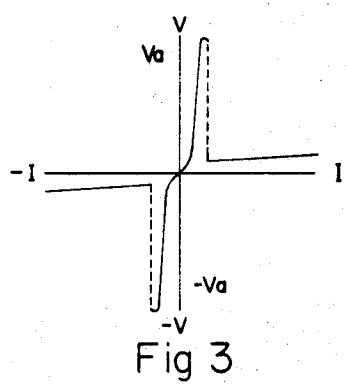
Fig 3
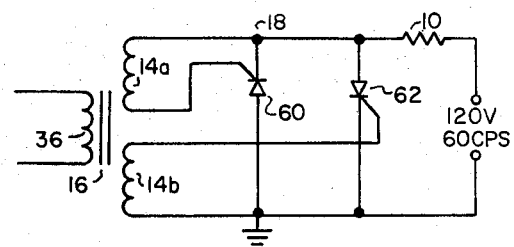
Fig 5
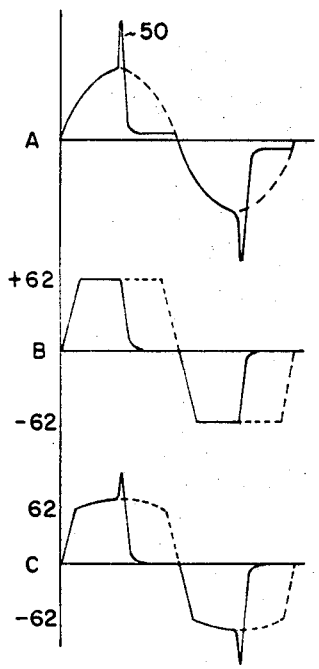
Fig 4
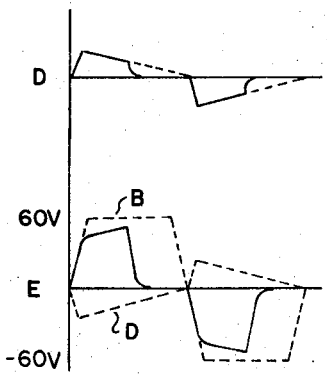
INVENTOR
John R. Harris Jr.
BY
ATTORNEY

United States Patent Office 3,384,763
Patented May 21, 1968

3,384,763
POWER CONTROL CIRCUIT UTILIZING LOW
RESISTANCE CONTROL
John R. Harris, Jr., Dallas, Tex., assignor to Hunt
Electronics Company, Dallas, Tex., a corporation
of Texas
Filed Feb. 5, 1965, Ser. No. 430,540
4 Claims. (Cl. 307—252)

ABSTRACT OF THE DISCLOSURE

There is disclosed as the preferred embodiment of the present invention a switching device which can be switched from a normally high impedance state to a low impedance state when a control signal is applied thereto and which is adapted to be connected in series with a load and a source of alternating current supply voltage. There is also disclosed circuitry for generating control signals to be applied to the switching device to obtain phase control of the effective power flowing through the load and which utilizes a variable resistance having a relatively low resistance as compared to other phase control circuits. The circuitry for generating the control signal includes means for generating a square wave signal of the same frequency as the alternating current supply voltage and means for generating a saw tooth signal which is also of the same frequency as the alternating current supply voltage. The square wave signal has a substantially constant amplitude, but the peak amplitude of the saw tooth signal is varied as a function of the variable resistor. The square wave signal and the saw tooth signal are both applied for the purpose of charging a capacitor. When the charge on the capacitor attains a predetermined level, a control signal is applied to the switching device causing the device to switch to its low impedance state. By controlling the peak amplitude of the saw tooth signal, the time during the half-cycle of applied voltage at which the control signal is generated is controlled thereby controlling the power applied to the load.

---

It has become quite common to control the application of power to a load from an alternating current supply source by controlling the conduction time of a switching device connected in series with the load and a source of alternating current supply voltage to thereby control the effective power applied to the load. A three electrode device known as the silicon controlled rectifier (SCR) has been used quite extensively in such applications, and circuits exemplary of those used in such applications are shown on pages 125–152 of the General Electric SCR Manual, 3rd edition, published in 1964 by the General Electric Company. More recently, a two terminal, multi-layer semiconductor device known as the Silicon Symmetrical Switch (SSS) has also been used quite extensively in such applications. Exemplary circuits embodying the SSS device are disclosed in United States Patents Nos. 3,188,487 and 3,188,490, both of which are assigned to the assignee of the present patent application.

The above mentioned circuits possess a high degree of utility and, as a consequence, have been accorded a substantial amount of commercial acceptance. Each of the circuits have one thing in common. Namely, they utilize a variable impedance element for controlling the conduction time of the switching device. In general, the resistive element utilized must be variable over a relatively wide range of resistances, normally not less than 0 to 5,000 ohms and, suitably, 0 to 20,000 ohms or higher.

A substantial amount of commercially available equipment which may be desirable to control utilizing the principles of the above identified circuits incorporate a variable resistor. Normally, these resistors are of low resistance, in the order of 100 to 1,000 ohms. It is therefore desirable that the control circuitry be capable of utilizing this control element for controlling the conduction times of the switching element.

The present invention provides a power control circuit for controlling the conduction time of a switching element and which utilizes a resistor having a relatively low resistance, suitably in the order of 100 to 1,000 ohms for controlling the conduction time of a switching device which may suitably be either an SCR, an SSS, or similar device.

In accordance with the present invention, a capacitor is connected across a bistable device which switches from a high impedance state to a low impedance state responsive to the charge on the capacitor attaining a level sufficient to energize the device to the low impedance state. Still another bistable device is connected in series with a load and a source of alternating current supply voltage. When the bistable device connected across the capacitor switches to the low impedance state, it provides a discharge path for the capacitor. The discharge of the capacitor through the bistable device connected across it is effective to produce a control signal which is applied to the other bistable device, causing the other bistable device to switch to the low impedance state and permit current to flow through the load for the remainder of a half cycle of alternating current supply voltage.

Means are provided for generating a square wave signal of the same frequency as the alternating current supply voltage and of an amplitude greater than that required to cause the first bistable device to switch to the low impedance state and applying the square wave to one terminal of the capacitor and one terminal of the first bistable device. There is also provided means for generating an alternating saw tooth signal whose leading edge is quite steep and whose amplitude is variable. The saw tooth signal is also of the same frequency as the alternating current supply voltage. The saw tooth signal is applied to the other terminal of the capacitor, whereby the voltage charging the capacitor is equal to the difference between the square wave signal and the saw tooth signal.

A variable resistance element, suitably one having a maximum resistance in the order of 1000 ohms or less, is included in the means for generating the saw tooth signal for controlling the amplitude thereof. The first bistable device will switch to the low impedance state when the instantaneous difference between the saw tooth signal and the square wave signal attains the required level. The conduction time of the second bistable device, and thereby the effective power through the load, can be varied by varying the variable resistance element to cause the time during a half cycle when the required signal level is attained to vary.

The features of the present invention which are believed novel are set forth with particularity in the appended claims. Many objects and advantages of the invention will, however, become apparent to those skilled in the art as the following detailed description of preferred embodiments of the invention unfolds when taken in conjunction with the appended drawings wherein like reference numerals denote like parts and in which:

FIGURE 1 is a schematic diagram of a preferred embodiment of the present invention;
FIGURE 2 illustrates the structure of an SSS device;
FIGURE 3 is a curve illustrating the voltage current characteristics of the SSS device shown in FIGURE 2;
FIGURE 4 is a series of curves illustrating the wave forms present in certain portions of the circuit of FIGURE 1; and
FIGURE 5 is a schematic diagram illustrating the principles of the present invention applied to a circuit utilizing a gated device.

Turning now to FIGURE 1 of the drawings, in accordance with one preferred embodiment of the present invention, a load 10 has one terminal thereof connected to one side of a source of alternating current supply voltage, suitably 120 volts 60 cycles. The other side of the load 10 is connected through an SSS device 12 and the secondary winding 14 of a transformer 16 to the other side of the alternating current supply voltage.

The juncture point 18 between the load 10 and the SSS device 12 is connected through a resistor 20 and a parallel circuit 22 to the other side of the alternating current supply voltage which is suitably grounded. One branch of the parallel circuit 22 comprises a resistor 24 and a double anode Zener diode 26. The other branch of the parallel circuit 22 comprises a capacitor 28, a resistor 30 and a variable resistor 32 connected in series. The tap 34 of the variable resistor 32 is connected through the primary winding 36 of transformer 16 and a second SSS device 38 to the juncture point 40 between the resistor 24 and the double anode Zener diode 26. A capacitor 42 is connected between the juncture point 40 and the tap 34 of resistor 32.

The SSS devices 12 and 38 are each typically of the configuration shown in FIGURE 2 and comprise layers 50, 52, 54, 56 and 58, contiguous layers being of opposite type conductivity. The layer 50 is formed in the surface of the layer 52, with both of the layers 50 and 52 being contacted by a common electrode 60. Similarly, the layer 58 is formed in the layer 56 with the electrode 62 contacting both of the layers 56 and 58. It will also be observed that the layers 50 and 58 are offset from one another whereby the device shown in FIGURE 2 is similar to the structure obtained by forming two side by side but oppositely poled PNPN devices in a common piece of semiconductor material.

The voltage current characteristics of the device shown in FIGURE 2 is shown in FIGURE 3. Thus, the device of FIGURE 2 will normally exhibit a very high impedance to the flow of current in either direction. However, when the voltage impressed across the device equals the avalanche voltage of the device, the device will switch to a quasi stable low impedance state and will remain in the low impedance state so long as the current flowing through the device remains above a critical level. At any particular time, the device of FIGURE 2 can only exhibit the low impedance condition to flow of current in one of the two directions, with the direction being dependent upon the polarity of the applied voltage which causes the device to break down and switch to the low impedance state.

In accordance with one preferred example of the present invention, the following components were utilized in a power control circuit.

| | |
|---|---|
| Device 12 | Hunt Electronics Company SSS device 200 volts. |
| Device 38 | Hunt Electronics Company SSS device 60 volts. |
| Device 26 | Double anode Zener diode device 62 volts. |
| Resistor 20 | 400 ohms. |
| Resistor 24 | 300 ohms. |
| Resistor 30 | 1,000 ohms. |
| Resistor 32 | 0 to 100 ohms. |
| Capacitor 28 | 4 microfarads. |
| Capacitor 42 | 0.1 microfarad. |
| Transformer 16 | Turns ratio 1:40. |

The operation of the circuit shown in FIGURE 1 of the drawings can perhaps best be understood with reference to an examination of the wave forms present at various points of the circuit. Thus, in the absence of breakdown of either of the devices 12 or 38, the signal appearing at juncture point 18 is a conventional sine wave of the type produced by conventional alternating current supply voltage sources.

Signal $b$ appearing at juncture point 40 will be a clipped sine wave with the amplitude of the wave being equal to the breakdown voltage of the Zener diode 26. In accordance with the specific example of the invention shown, the amplitude of the wave form $b$ will be 62 volts. The wave form $b$ is essentially a square wave of frequency the same as the applied alternating current supply voltage.

When the voltage appearing at point 40 exceeds the breakdown voltage of the Zener diode 26, current will flow through the resistor 20 and resistor 24 with the voltage developed across the resistors 20 and 24 being equal to the difference between the potential appearing at juncture point 40 and the instantaneous voltage of the applied alternating current supply voltage at point 18. Wave form $c$ appearing at the juncture between resistor 20 and resistor 24 will therefore be shown in curve $c$ of FIGURE 4, and will be the sum of the potential appearing at point 18 and the voltage developed across resistor 24.

The signal $c$ is applied across the series circuit comprising a capacitor 28, resistor 30 and variable resistor 34. Signal $d$ appearing at the tap 34 of resistor 32 will be as shown in FIGURE 4 of the drawings and will be a function of the rate at which the capacitor 28 is charged. Thus, the signal $d$ will increase to a maximum value very soon in the half cycle of alternating current supply voltage and will thereafter decrease to 0 at the end of a half cycle of alternating current supply voltage. It will be noted that the curve $d$ decreases from its maximum to minimum values as very nearly a linear function.

It will be appreciated that the circuit would be operative if the resistor 24 were not provided. However, in this instance, the curve $d$ would decrease from its maximum value to its minimum value at a rate characteristic of the charge or discharge of a capacitor. The maximum amplitude of the curve $d$ is, of course, dependent upon the position of the tap 34 of resistor 32. Thus, the greater the resistance between tap 34 and ground, the greater the amplitude of curve $d$ will be.

The voltage appearing across the capacitor 42 and the device 38 will be as represented in curve $e$. It can be seen that the voltage represented by curve $e$ is equal to the difference in the voltage $b$ and the voltage $d$.

It will also be noted that the Zener diode is chosen to have a breakdown voltage greater than the breakdown voltage of device 38. By varying the position of tap 34, the instantaneous amplitude of the signal $d$ is varied between the minimum and maximum levels, causing the time $T_1$, at which breakdown of device 38 occurs, to change in a substantially linear fashion, controlling the conduction time of device 12. Thus, if the tap 34 is moved to its lowermost position in which it will be at ground potential, the voltage $e$ across the capacitor 42 will very closely follow the wave form $b$, and the device 38 will switch to the low impedance state when the instantaneous potential of the alternating current supply voltage becomes equal to the breakover voltage of device 38, and substantially full wave power will be applied to the load. As the tap $d$ of the resistor 32 is moved upward, increasing the resistance between tap 34 and ground, the maximum instantaneous value of the voltage represented by wave form $d$ will increase, and the voltage $e$, the difference between voltage $b$ and voltage $d$, will not attain a value of 60 volts until very near the end of the half cycle, and the effective power through the load will be quite small. However, at points near the end of the half cycle, as when the instantaneous value of applied alternating current supply voltage becomes near 62 volts, the amount of current flowing through the capacitor 28 and resistor 30 and resistor 32 will be quite small. As a consequence, the potential $d$ between tap 34 and ground will be quite small, and the voltage $e$ appearing across the capacitor 42 will therefore always attain a value of at least 60 volts at some point in the half cycle.

At the time, denoted by time $T_1$ in FIGURE 4 of the drawings, that the voltage signal $e$ attains an instantaneous amplitude of 60 volts, the device 38 will switch to its low impedance state, providing a discharge path for the capacitor 42 through the primary winding 36 of transformer 16. When the capacitor 42 discharges through the primary winding 36, it will causes a high voltage pulse 50 to appear at juncture point 18. This high voltage pulse will be of a character to cause the device 12 to switch to its low impedance state, providing a low resistance path from juncture point 18 to ground and permitting current to flow through the load 10 for the remainder of that half cycle of alternating current supply voltage. Once the device 12 breaks down, it will be noted that the potential appearing at point 18 will be quite small, in the order of 1 volt or less, and that substantially full instantaneous power will be applied to the load 10 for the remainder of the half cycle.

From the above, it will be seen that at any time the voltage $e$ across the capacitor attains a level equal to the breakdown voltage of the device 38, device 38 will switch to its low impedance state, causing the device 12 to also switch to its low impedance state, permitting current to flow for the remainder of the half cycle. Since the slope and maximum instantaneous amplitude of the curve $d$ is controlled by the variable resistor 34, which can be of a very low resistance, and since the device 26, device 38 and device 12 are each symmetrical, full wave control of power from substantially 0 to approximately 95% of full power can be obtained.

The power control circuit of the present invention can also be utilized to control gated devices, such as a silicon controlled rectifier, as shown in FIGURE 5. Thus, it is seen that the firing circuit is identical to that described in FIGURE 1. However, two parallel connected oppositely poled silicon controlled rectifiers 60 and 62 are connected between juncture point 18 and ground. Transformer 16 includes two windings 14a and 14b. Winding 14a is connected between the gate electrode and the cathode of silicon controlled rectifier 60 and the winding 14b is connected between the gate electrode and the cathode of silicon controlled rectifier 62. Thus, during a positive half cycle of alternating current supply voltage, the voltage induced in the secondary windings 14a and 14b of transformer 16 will be of a polarity to cause the silicon controlled rectifier 62 to switch to its low impedance state when the voltage $e$ attains an amplitude equal to the breakover voltage of the device 38. During negative half cycles, the capacitor 42 will be charged in a direction to cause voltage to be induced in the windings 14a and 14b upon breakover of the device 38 of a polarity to cause the silicon controlled rectifier 60 to switch to its low impedance state.

Although the present invention has only been described with reference to particular preferred embodiments thereof, many changes and modifications will become obvious to those skilled in the art. The foregoing description is therefore intended to be illustrative and not limiting of the invention defined in the appended claims.

What I claim is:
1. A power control circuit for controlling the effective power applied to a load that comprises:
    (a) a bistable device having two power terminals;
    (b) said device normally exhibiting a high impedance to the flow of current in at least one direction but being switched to a quasi stable low impedance state in said at least one direction when a control signal is applied thereto and remaining in said low impedance state so long as current flows through said device in said one direction;
    (c) means for connecting said device in series with a load and a source of alternating current supply voltage through said power terminals; and
    (d) means for generating and applying to said device said control signal;
    (e) said last named means including:
        (1) means for providing a square wave signal of the same frequency as said alternating current surrent supply voltage,
        (2) means for providing a saw tooth signal whose leading edge is substantially steeper than its trailing edge,
        (3) means effective responsive to the difference in voltage between said square wave signal and said saw tooth signal attaining a predetermined level for generating and applying to said bistable device said control signal, and
        (4) variable impedance means for varying the instantaneous amplitude of said saw tooth signal.

2. A power control circuit as defined in claim 1 wherein said bistable device is a semiconductor device having at least four layers, contiguous layers being of opposite conductivity type.

3. A power control circuit as defined in claim 1 wherein said last named means comprises a parallel branch circuit connected in shunt with said bisable device and including:
    (a) a Zener diode;
    (b) a series circuit connected in shunt with said Zener diode and including a first capacitor and a variable resistor having a tap; and
    (c) means effective responsive to difference between the potential across said Zener diode and the potential appearing at the tap of said resistor attaining a predetermined level for generating and applying to said bistable device said control signal.

4. A power control circuit as defined in claim 1 wherein said bistable device is a semiconductor diode having at least four layers, contiguous layers being of opposite conductivity type, said device being switched to the low impedance state when the voltage thereacross attains a level equal to the avalanche voltage of said device, the avalanche voltage of said device being greater than the maximum instantaneous voltage of the alternating current supply voltage and wherein said means effective comprises:
    (a) a capacitor;
    (b) a transformer having an input winding and an output winding;
    (c) a second semiconductor diode having at least four layers, the avalanche voltage of said second semiconductor diode being less than the amplitude of said square wave signal but greater than difference voltage at times when the first mentioned diode device is not desired to conduct;
    (d) means connecting said second semiconductor device, said capacitor and said input winding in a series loop;
    (e) means connecting said difference voltage across one of said capacitors and said second semiconductor device; and
    (f) means connecting said output winding in series with the first mentioned semiconductor device.

References Cited

UNITED STATES PATENTS 3,189,747  6/1965  Hoff _____ 307—88.5
3,346,874  10/1967  Howell _____ 307—88.5

OTHER REFERENCES

Electronics, "Backward Diode," by Bukstien, November 1958.

ARTHUR GAUSS, *Primary Examiner.*

B. P. DAVIS, *Assistant Examiner.*